United States Patent [19]
Johnson

[11] 4,072,947
[45] Feb. 7, 1978

[54] MONOTONICALLY RANGING FM-CW RADAR SIGNAL PROCESSOR

[75] Inventor: Henry Charles Johnson, Neshanic, N.J.

[73] Assignee: RCA Corporation, New York, N.Y.

[21] Appl. No.: 741,068

[22] Filed: Nov. 11, 1976

[51] Int. Cl.² .............................................. G01S 9/24
[52] U.S. Cl. ....................................................... 343/14
[58] Field of Search ........................ 343/14 (U.S. only)

[56] References Cited
U.S. PATENT DOCUMENTS

| | | |
|---|---|---|
| 2,522,863 | 9/1950 | Crosby .................................... 343/14 |
| 3,287,725 | 11/1966 | Webb ....................................... 343/14 |
| 3,419,814 | 12/1968 | Graves et al. ........................ 343/9 X |
| 3,461,452 | 8/1969 | Welter ................................. 343/14 X |
| 3,530,470 | 9/1970 | Sheftelman et al. ........... 343/6.5 LC |
| 3,735,402 | 5/1973 | Mosher ................................... 343/14 |

Primary Examiner—Malcolm F. Hubler
Attorney, Agent, or Firm—H. Christoffersen; Joseph D. Lazar; Raymond E. Smiley

[57] ABSTRACT

A signal processor for monotonic FM-CW ranging system having reduced quantization error. The difference signal from FM-CW radar is applied to two cascaded phase locked loops (PLL). The second PLL is modified for unidirectional frequency tracking.

4 Claims, 1 Drawing Figure

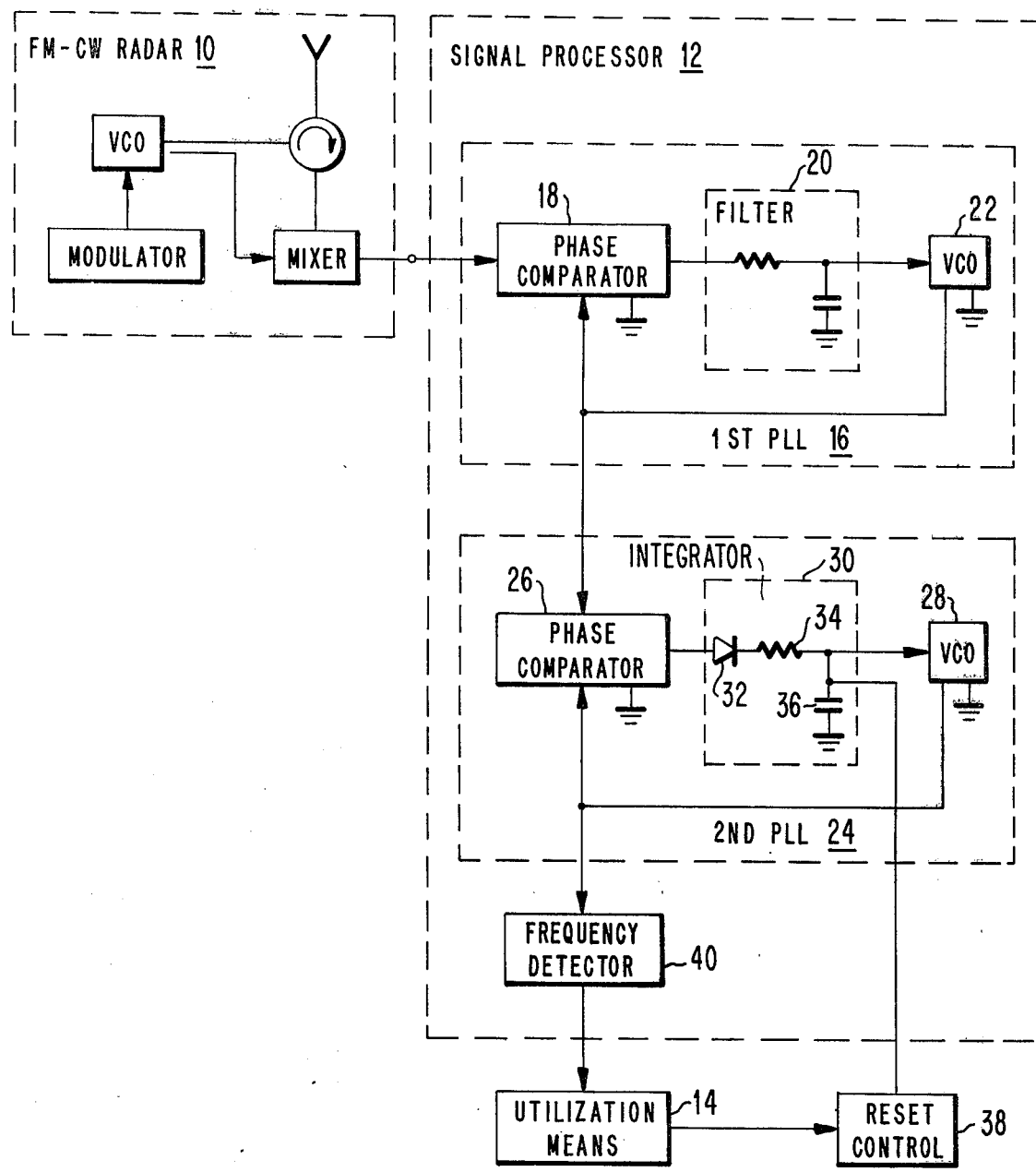

MONOTONICALLY RANGING FM-CW RADAR SIGNAL PROCESSOR

BACKGROUND OF THE INVENTION

1. Field of the Invention

The present invention relates to continuous wave radar ranging systems and, in particular, to a signal processor for use therein.

2. Description of the Prior Art

In continuous wave (CW) radar ranging systems, a frequency modulated interrogation signal is transmitted toward a target and is reflected therefrom back to the interrogating unit. The reflected signal is received by the interrogating unit, mixed with a sample of the interrogation signal, and filtered to obtain a difference signal. The finite distance or range between the interrogating unit and the target introduces a round trip delay $\tau$ between the return signal and the instantaneous interrogation signal sample. Expressed mathematically, $$\tau = 2R/C \tag{1}$$

where R is the range and C is the velocity of light. Hence, since the interrogation signal is frequency modulated with a given modulation waveform, the reflected signal as received at the interrogating unit is delayed in time, and hence shifted in frequency, from the instantaneous interrogation signal by an amount proportional to the range. For example, where a triangular waveform having a total frequency excursion of $\Delta F$ and a period of $1/f_m$ is used to frequency modulate the interrogation signal, the frequency shift or difference frequency $f_R$, as generated by a suitably filtered mixer, equal to the time derivative of the frequency of the interrogation signal times the round trip time delay, is:

$$f_R = df/dt \times \tau = 4\Delta F f_m R/C \tag{2}$$

Thus, the range between the target and the interrogating station may be computed by a measurement of frequency shift $f_R$.

Conventional processors measure the difference frequency by counting the number of zero crossings in the difference signal that occur within a fixed time interval. More specifically, the difference signal is applied to a counting circuit which develops a signal that is proportional to the rate of zero crossings.

However, the difference signal waveform undergoes periodic phase discontinuities at a rate of twice the frequency ($f_m$) of the modulation waveform of radar 10. For a description of such phenomenon reference is made to U.S. Pat. No. 3,968,492 issued July 6, 1976 to G. S. Kaplan and to U.S. Pat. No. 3,974,501 issued Aug. 10, 1976 to A. B. Ritzie, both assigned to the assignee of the present invention. It should be appreciated that the phase discontinuities cause the number of zero crossings occuring during a half cycle of the FM waveform to vary, resulting in an ambiguity in the indicated range. Such ambiguity is particularly evident in that a target receding from radar 10 by a distance equal to one quarter (¼) wavelength of the transmitted signal frequency may, due to the variation in the number of zero crossings during the half FM waveform cycle, appear to advance toward the target.

This phenomenon can be an acute problem in systems operating on targets having complex or changing reflective surfaces. For a more detailed description of such phenomenon reference is made to "Frequency Modulated Radar", D. G. C. Luck, Chapter 4, McGraw-Hill, 1949.

For a description of various methods to minimize quantization of the measured difference frequency due to the phase discontinuities reference is made to the above-cited Kaplan and Ritzie patents.

There are, however, numerous applications in which during the desired range measuring period, the range increases or decreases monotonically, that is, without reversing directions. An example of such monotonic ranging is the measurement of the level of a material in a container as the container is being emptied. Such a measurement is often made in the operation of an iron blast furnace. The furnace is filled with "burden", a mixture of iron ore, coke, and limestone, and as the burden is melted to form molten iron, the level of the burden in the furnace decreases. When the level of the burden in the furnace decreases to a predetermined level, new burden is added through a gate located in the top of the furnace. Molten iron and slag are removed every 15 to 30 minutes from the bottom of the furnace.

Another such application is the monitoring of the drilling rate and depth of a drilling rig bit where during the drilling process, the drill bit continually penetrates deeper into a drilled material.

The present inventor has found that where the measured range varies monotonically quantization error can be substantially reduced by a signal processor of considerably simpler implementation than that required in conventional ranging systems.

SUMMARY OF THE INVENTION

The present invention is directed to a signal processor for an FM-CW radar for determining the range of a target where the target range varies monotonically. The signal processor includes first frequency tracking means for generating an output signal having a continuous phase velocity at a frequency substantially equal to the radar difference frequency and second frequency tracking means for generating an output signal indicative of the value of a predetermined frequency extremum of the first frequency tracking means output signal. The second frequency tracking means output signal is indicative of the range of the target.

BRIEF DESCRIPTION OF THE DRAWING

The sole FIGURE of the drawing is a block diagram of an FM-CW radar in accordance with the present invention.

DESCRIPTION OF A PREFERRED EMBODIMENT

Referring to the drawing, a conventional FM-CW radar 10 is coupled to a signal processor 12 embodying the present invention. Single processor 12 is, in turn, coupled to suitable utilization means 14, such as an indicator or triggering device.

FM-CW radar 10 is of conventional type, such as described in F. E. Nathanson, "Radar Design Principles", pp. 365-367, McGraw-Hill, 1969. As noted above, radar 10 generates an FM-CW probe signal, receives reflection from the target and mixes the reflected signal with a sample of the probe signal to generate an output signal, commonly referred to as the "difference signal", having a frequency indicative of the distance of a reflective target from the radar. Cooperative ranging systems, such as the harmonic system described in U.S. Reissue Patent RE. No. 28,302 issued Jan. 14, 1975 to H. Staras and J. Sheffer, may also be utilized as radar 10. As noted above, the radar output signal undergoes periodic phase discontinuities at a rate of twice the frequency ($f_m$) of the modulation waveform of radar 10.

Signal processor 12 includes first and second phase locked loops, 16 and 24 respectively, in cascade connection and a conventional frequency detector 40. The radar output signal is applied to first phase locked loop (PLL) 16. PLL 16 comprises conventional components; a phase comparator 18, a low-pass filter 20 and a voltage-controlled oscillator (VCO) 22. Comparator 18 and VCO 22 are commercially available as a single integrated circuit (IC), for example, the RCA CD 4046 COS/MOS Digital Integrated Circuit. Phase comparator 18 is receptive of the radar output signal and the output signal of VCO 22 and the output terminal thereof is coupled through low pass filter 20 to the control terminal of VCO 22.

PLL 16 comprises means for providing a signal having a frequency equal to the radar output frequency but without the phase inversions of the radar output signal. Phase comparator 18 generates an output signal indicative of phase difference between the output signal of VCO 22 and the radar output signal. Low pass filter 20 is chosen to have a time constant such that the loop damping factor is long as compared to the radar modulation frequency ($f_m$). The periodic phase discontinuities in the output signal of radar 10 result in an elongated or foreshortened period in the signal, followed by a phase shift of the following periods. The periodic phase inversions of the radar output signal are manifested in the comparator (18) output signal, but are, in effect, averaged out over a large number of cycles of $f_m$ by the loop damping. The frequency of the VCO (22) output signal is varied in accordance with the output signal of filter 20. First PLL loop 16, therefore, operates to track the frequency of the radar output signal, generating an output signal having a continuous phase velocity at a frequency substantially equal to the radar output signal frequency.

The output signal of VCO 22, taken as the output signal of first PLL 16, is applied as an input signal to second PLL 24. PLL 24 comprises a phase comparator 26 and VCO 28, respectively, similar to phase comparator 18 and VCO 22 of PLL 16, and a integrator means 30, to be hereinafter described. Phase comparator 26 is receptive of the output signal of PLL 16 and of the output signal of VCO 28, and the output signal thereof is applied through filter circuit 30 to the control input of VCO 28. Integrator means 30 suitably comprises unilaterally conductive means, for example, a diode 32 and a resistor 34 in series connection between the output terminal of phase comparator 26 and the control input terminal of VCO 28, and an integrator network, such as a capacitor 36 connected between the VCO 28 control input terminal and ground, cooperative with the unilaterally conductive means.

PLL 24 comprises a means, responsive to a signal of varying frequency, for generating an output signal having a frequency indicative of a predetermined frequency extremum of the varying frequency signal. More specifically, in the context of the radar ranging apparatus of the FIGURE PLL 24 generates an output signal having a frequency indicative of a predetermined frequency extremum of the radar output signal, that is, either the highest or lowest frequency attained by the radar output signal. Phase comparator 26 generates an output signal having an average amplitude indicative of the phase difference between the PLL (16) output signal and the output signal of VCO 28. Resistor 34 and capacitor 36 together comprise an integrator network, which accumulates a charge in accordance with those output signals of phase comparator 26 passed through diode 32. The voltage appearing across capacitor 36 in accordance with Coulombs Law due to accumulated charge controls the frequency of the output signal of VCO 28. However, where VCO 28 has a positive transfer function, diode 32 is forward biased with respect to, and thus passes, only those output signals of phase comparator 26 having an amplitude greater than the potential across capacitor 36. Phase comparator 26 generates signals of relatively high average positive amplitude only when the output signal of PLL 16 is of higher frequency than the output signal of PLL 24. Since charge is accumulated in capacitor 36 only in response to phase comparator (26) output signals of amplitude capable of forward biasing diode 32, the output signal of VCO 28 tracks only positive-going frequency excursions in the radar output signal. Thus, the output signal of VCO 28, taken as the output signal of second PLL 24 is indicative of the highest value of frequency attained by the difference signal. It should be appreciated, that PLL 24 can be made to generate an output signal indicative of the minimum frequency extremum of the radar output signal by reversing the polarity of diode 32 or, in some instances, by using an oscillator with frequency decreased by positive modulating voltage. It should be appreciated that PLL 16 operates to isolate PLL 24 from the phase discontinuities in the radar output signal by generating a continuous phase velocity output signal. The frequency of such signal, however, still manifests the quantization error. PLL 24, by tracking frequency excursions in one direction only, eliminates the above described spurious frequency excursion in the opposite direction caused by the variation in number of zero crossings. Isolation of PLL 24 from the phase discontinuities in the radar 10 output signal is necessary to prevent capacitor 36 from erroneously accumulating charge in response to each foreshortened period in the radar output signal.

The output signal of the second PLL 24 is applied to frequency detector 40. Frequency detector 40 is suitably a frequency-to-analog converter, or a zero crossing detector cooperating with a counter. For a description of a suitable frequency detector 40 reference is made to the aforementioned "Frequency Modulated Radar" by D. G. C. Luck.

A shaped gain frequency response amplifier, if desired, may be interposed between radar 10 and signal processor 12 to boost the signal strength of signals corresponding to the more distant ranges. Similarly, signal processor 12 may include a sample-and-hold circuit to maintain accurate range readings during periods of low signal strength.

When the range of the target has reached a predetermined threshold value, for example as determined by utilization means 14, the charge on capacitor 36 is reset by a resetting means 38, to a predetermined level. Resetting means 38 is suitably a switched voltage source or a switched electrical path to ground.

A signal processor 12, in accordance with the present invention, has been built for use in conjunction with a conventional ranging type FM-CW radar and used to measure the burden height in an iron producing blast furnace. The radar transmits a triangular modulated probe signal having a center r.f. frequency of about 10.5 GHz and a total frequency deviation of 150 MHz. In this application a shaped gain-amplifier is used to connect radar 10 to PLL 16 in signal processor 12. Two RCA CD 4046 integrated PLL oscillators were respectively utilized in PLL 16 and PLL 24. A 1N914 diode used in PLL (24) provides for monotonic tracking. The output signal of PLL (24) is used to trigger a monostable multivibrator (one shot), the output pulses of which are averaged and displayed on a digital panel meter calibrated in feet.

The error for an unmodified radar of the above mentioned r.f. characters is ± 20 inches. The addition of a low frequency sine wave wobble signal to the triangular probe modulation can reduce the error to approximately ± 6 inches. The inclusion of the disclosed invention has been found to receive the error further to approximately ± 2 inches.

What is claimed is:

1. In a continuous wave radar ranging system of the type wherein a signal is transmitted in the direction of a target and is reflected from said target back to the source of said transmitted signal, the range of said target from said ranging system varying monotonically, said transmitted signal being frequency modulated in accordance with a given periodic waveform, said ranging system including means for deriving from said transmitted signal and said reflected signal a difference signal indicative of the frequency difference of said reflected signal from the instantaneous frequency of said transmitted signal, and signal processor means, responsive to said difference signal, for generating an output signal indicative of the range of said target; the improvement wherein said signal processor comprises:
   first frequency tracking means, responsive to said difference signal, for generating an output signal having continuous phase velocity at a frequency indicative of said difference frequency; and
   second frequency tracking means, responsive to said first frequency tracking means output signal, for generating an output signal indicative of the value of a predetermined frequency extremum attained by said difference signal, said second frequency tracking means output signal being indicative of said range.

2. The signal processor of claim 1 wherein said first frequency tracking means comprises a phase locked loop including in loop connection, a phase comparator, a low pass filter and a voltage controlled oscillator; and
   said second frequency tracking means comprises a monotonic phase-locked loop including in loop connection, a second phase comparator, an integrator means, and a second voltage controlled oscillator (VCO), said second phase comparator generating an output signal applied to said integrator means, said integrator means comprising a charge storage means, responsive to predetermined polarity portions of said second phase comparator output signal, for resettably accumulating a charge indicative of said frequency extremum value, said VCO being responsive in frequency to the magnitude of said accumulated charge; and
   said second frequency tracking means further comprises resetting means cooperating with said charge accumulation means for selectively resetting the magnitude of said charge to a predetermined value.

3. The signal processor of claim 2 wherein said charge storage means comprises a diode and a capacitive network, said diode being coupled between said phase comparator and said capacitive network.

4. The signal processor of claim 1 wherein said first frequency tracking means comprises a phase locked loop including in loop connection, a phase comparator, a low pass filter and a voltage controlled oscillator; and
   said second frequency tracking means comprises a phase-locked loop including in loop connection, a second phase comparator, an integrator means, and a second voltage controlled oscillator (VCO), said second phase comparator generating an output signal applied to said integrator means,
   said integrator means comprising a charge storage capacitor and unilaterally conductive means, connecting said second phase comparator to said capacitor, for applying predetermined polarity portions of said second phase comparator output signal to said capacitor to effect in said capacitor accumulation of a charge indicative of said frequency extremum, said VCO being responsive in frequency to said accumulated charge,
   said integrator means further comprising resetting means, cooperating with said accumulation means, for selectively resetting said charge to a predetermined value.

* * * * *